United States Patent [19]
Koss

[11] 3,767,499
[45] Oct. 23, 1973

[54] METHOD OF MAKING POROUS LAMINATE

[76] Inventor: Muriel L. Koss, 10560 Robinson Ave., Arlington, Calif. 92503

[22] Filed: Sept. 9, 1971

[21] Appl. No.: 179,088

Related U.S. Application Data

[63] Continuation-in-part of Ser. No. 864,126, Oct. 5, 1969, abandoned.

[52] U.S. Cl.................. 156/181, 156/296, 161/57, 161/68, 161/113, 161/140, 181/33
[51] Int. Cl............................................ B32b 5/12
[58] Field of Search.......................... 161/55, 57–60, 161/68, 140, 143, 112, 113, 156, 157; 156/180, 181, 296, 433, 441; 181/33 R, 33 G, 33 GA

[56] References Cited
UNITED STATES PATENTS 3,266,130  8/1966  Glaze................................ 29/163.5
2,857,657  10/1958  Wheeler........................ 156/181 X
3,519,509  7/1970  Gidge et al. ...................... 156/181

Primary Examiner—William A. Powell
Attorney—George E. Pearson

[57] ABSTRACT

An apertured laminate which may be used as a face sheet of a honeycomb core sound suppression panel for a jet aircraft engine is formed from a plurality in excess of two superposed layers of thin, ribbon-like bands of selected widths, the bands of each layer being parallel and spaced apart by gaps of selected widths. The bands of each layer are disposed at different, selected angles to those in each of the other layers, and the gaps in successive layers are arranged to intersect and register at selected common points to define apertures of selected size, shape and distribution in the resultant laminate.

4 Claims, 7 Drawing Figures

PATENTED OCT 23 1973 3,767,499

INVENTOR.
MURIEL L. KOSS

BY

ATTORNEY

INVENTOR.
MURIEL L. KOSS
BY
ATTORNEY 3,767,499

METHOD OF MAKING POROUS LAMINATE

BACKGROUND OF THE INVENTION

This is a continuation-in-part of my U.S. Pat. Application, Ser. No, 864,126, filed Oct. 5, 1969, now abandoned. In recent years substantial efforts have beem made to reduce the noise of aircraft jet engines, particularly in the vicinity of airports, and for this purpose acoustical honeycomb panels have been widely used. Such well known panels usually comprise an imperforate backing sheet of thin material, a honeycomb core, and an apertured facing sheet. The materials generally used are aluminum and stainless steel, and in some instances, titanium. The apertures in the facing sheet, which faces the sound source, admit sonic energy, which is dissipated and transformed into heat in the resonant chamber thus provided.

While aluminum is satisfactory in many instances for the apertured facing sheet for such honeycomb panels, there are times when greater corrosion resistance is required. This requirement can usually be satisfied by using stainless steel or titanium for the aperture facing sheet, but such panels are expensive, and also may be heavier.

In the past various types of woven and other multi-layer fabrics have been developed for various purposes which, at least in some stage of their manufacture, are of somewhat controlled porosity, for example those disclosed in U. S. Pat. Nos. 3,083,864; 3,123,446; 3,425,884 and 2,664,375. However, in all of these prior art disclosures, the result is an open mesh fabric, and none of them provides a thin, light-weight laminate with small apertures of selected size and shape, which are located at selected, spaced points throughout the laminate.

SUMMARY OF THE INVENTION

A primary objective of this invention is to provide a thin, light-weight laminate comprising a plurality of layers of ribbon-like bands of selected widths, with the adjacent bands parallel and spaced apart by gaps of selected widths, and the bands of at least three of the layers arranged at selected different angles relative to the bands of each of the other of such three layers. The gaps between the ribbon-like bands in all of the layers have common intersection points at selected spaced intervals throughout the resultant laminate to define apertures in the laminate at such points, the laminate being impregnated with hardenable resin to bond the laminate into a unitary structure.

The laminate may be strengthened in one or more selected directions by increasing the number of strength, or both, of the bands extending in each such direction.

BRIEF DESCRIPTION OF THE DRAWINGS

The foregoing objectives and advantages of the present invention will be apparent from the following description of the accompanying drawings, wherein.

DETAILED DESCRIPTION OF THE DRAWINGS

Figure 1:
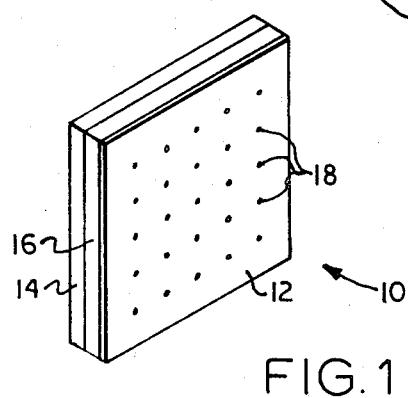
FIG. 1 is a perspective view of a small, sound suppression panel embodying the present invention.

Referring to the drawings in detail, a small sound suppression panel 10, see FIG. 1, comprises an apertured facing sheet, 12 embodying the present invention, an impervious backing sheet or member 14, and an intermediate resonant chamber layer 16, which may be of conventional honeycomb core material. The members 14, 16 and 18 are securely interconnected in a usual manner, for example, by bonding with a suitable adhesive, such as epoxy cement.

Figure 2:
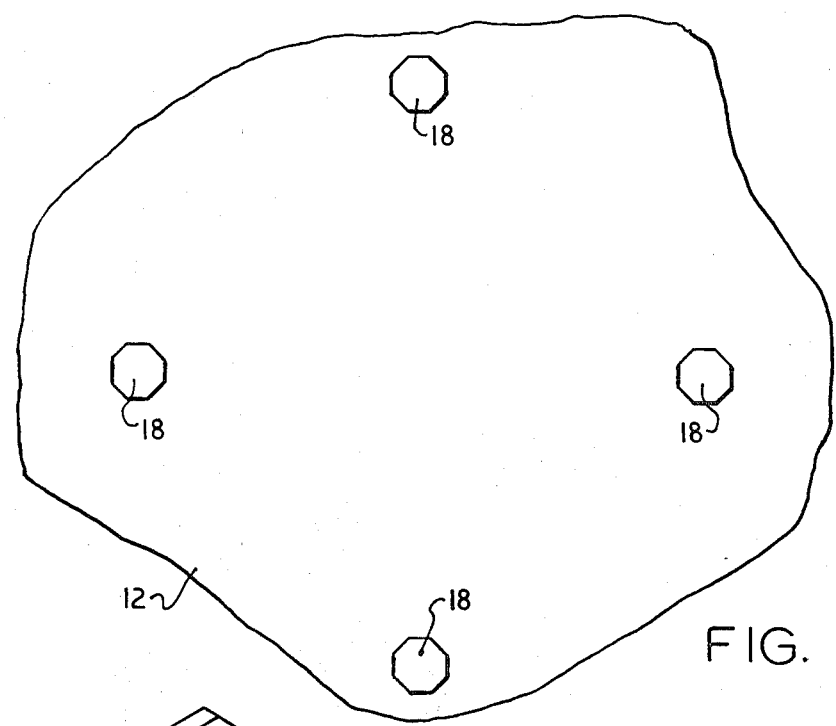
FIG. 2 is an enlarged, fragmentary, elevational view of a portion of the face skin of the panel shown in FIG. 1.

The apertured, laminar facing sheet 12 has a multiplicity of small apertures 18 therein, which are of selected size, shape and spacing or distribution on the sheet, one arrangement of which is shown in FIG. 2. The filamentary structure of the laminar, apertured facing sheet 12 FIG. 1 and a perferred method of making it is illustrated in FIGS. 2 and 3.

As illustrated herein the ribbon-like bands used in making the laminate are made up of individual filaments of filament-like elements which may be either single or multi-strand, thread, tape, roving, etc., capable of forming a ribbon-like band, either alone, or placed in side-by-side relation as shown in FIGS. 3, 4, 6 and 7. The bands, or individual elements thereof, may be of any suitable material including, but not limited to, metals, glass, graphite, refractory fiber, boron and others.

Figure 3:
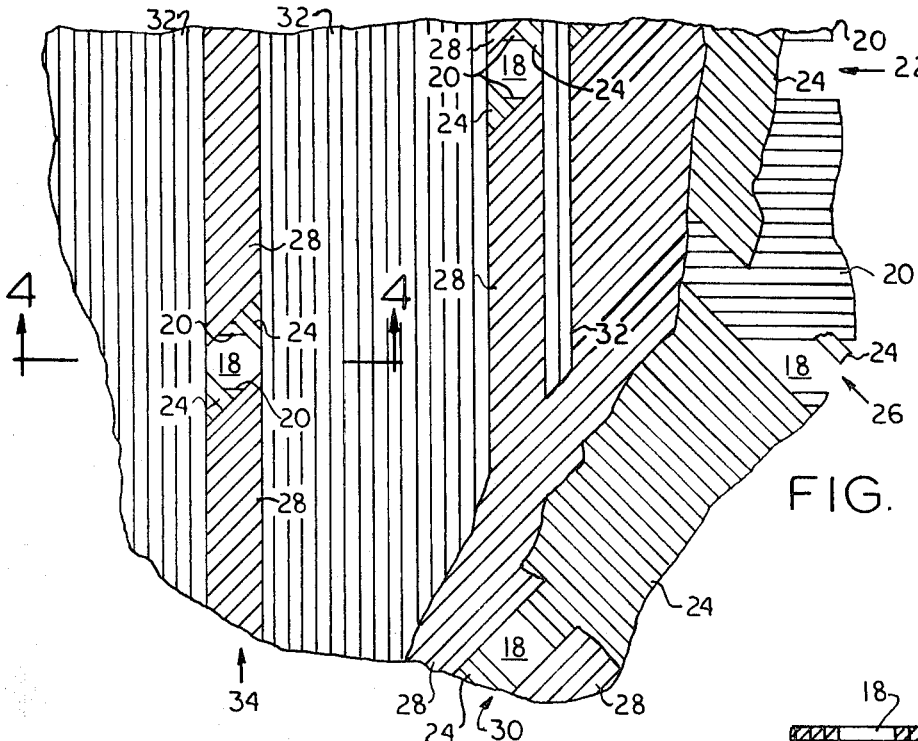
FIG. 3 is an elevational view of the fragment shown in FIG. 2, the resin matrix being omitted, and portions being broken away.
Figure 4:
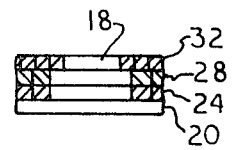
FIG. 4 is a fragmentary, sectional view taken along line 4—4 of FIG. 3.

In FIGS. 3 and 4 a first layer comprises a plurality of single strand filaments 20 arranged in side-by-side relation to form a plurality of ribbon-like bands 20A of selected width. The bands 20A are arranged in parallel relation and are spaced apart by gaps 22, also of selected width.

A second, generally similar layer comprises a plurality of single strand filaments 24, arranged in side-by-side relation to form a second plurality of ribbon-like bands 24A. The bands 24A are arranged in parallel relation and are spaced apart by gaps 26 of selected width. The bands 24A are disposed at a selected angle, in this case 45°, to the bands 20A, and at the stage of manufacture where only the first and second layers are assembled, the intersections of the gaps 18 and 26 define openings 18 a of rhombus shape, see at the right of FIG. 3, the gaps 22 and 26 being of equal width.

A third, generally similar layer comprises a plurality of ribbon-like bands 28A of single strand filaments 28, separated by gaps 30 of the samd width as the gaps 22 and 26. The bands 28A are of the same width as the bands 24A of the second layer and the gaps 30 are spaced and arranged to center on the intersections of the gaps 22 and 26 of the first two layers, so that upon completion of the third layer the openings appear as at 18 b in the lower portion of FIG. 3.

The fourth or final layer of FIGS. 3 and 4 comprises parallel, ribbon-like bands 32A of single strand filaments 32 arranged at right angles to the filaments 20 of the first layer, and at an angle of 45° to the filaments 24 and 28 of the second and third layers. The gaps 34 in the fourth layer are centered on the openings 18 b of the first three layers or lamina, and are of the same width as the gaps in the first three layers, so that they complete the forming of the apertures to octagonal shape as shown in 18 c at the left and top portions of FIG. 3.

The selected widths of the various ribbon-like bands, as well as the selected widths of the various gaps between adjacent bands in the same layer, determine the size, shape and spacing of the apertures in the resultant laminate.

The apertures 18 c in the completed laminate of FIGS. 3 and 4 are of octagonal shape. They are assumed to be of the order of .040 inch right diameter and spaced apart on the order of 0.300 inch, or as required by the cell size of a honeycomb core with which the laminate is to be used.

Figure 6:
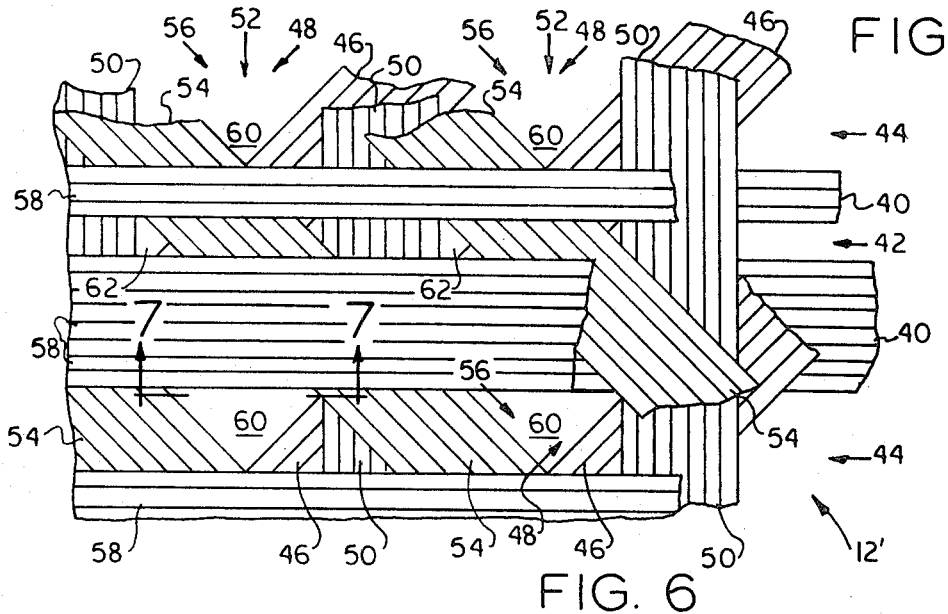
FIG. 6 is a view of the same nature as FIG. 3 showing a five layer laminate with a different arrangement of the ribbon-like bands to provide apertures of different sizes, shapes and spacings from those of FIGS. 3 and 4.
Figure 7:
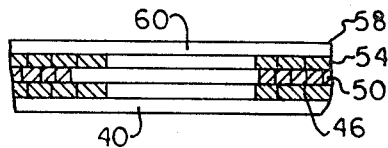
FIG. 7 is a fragmentary sectional view taken along line 7—7 of FIG. 6.

FIGS. 6 and 7 show a five layer laminate with apertures of different sizes and shapes, and with varying spacing therein. As shown in these figures, in a first layer of filaments 40 the filaments are arranged in ribbon-like bands 40A and 40B of different widths and with gaps 42 and 44 of different widths between selected bands.

A second layer of bands 46 is superposed on the first layer at an angle of 45° to the bands of the first layer, with relatively wide gaps 48 between adjacent groups. A third layer of bands 50 with gaps 52 therebetween is then applied with the bands 50 at right angles to those of the first layer, and is followed by a fourth layer of bands 54 with gaps 56 therebetween.

The bands 54 of the fourth layer are disposed at an angle of 90° to those 54 of the second layer, and 45° to those of the first and third layers, respectively. A final or fifth layer of bands 58 is superposed directly over, and in registry with, the bands 40A of the first layer, thereby increasing the strength of the laminate in the direction of the latter filaments without changing the size, shape or distribution of the apertures.

By the arrangement of the bands of the several layers as shown in FIGS. 6 and 7, it will be noted that the apertures in the resultant laminate range from large, generally triangular apertures 60 and smaller trapezium shape apertures 62 to even smaller ones which may be seen in FIG. 7.

The layers of the laminate are bonded together into a unitary laminate by a suitable binder such as, one of the many resins, including, but not limited to, epoxy, polyester, phenolic, polyimide, silicone, or a suitable metal or ceramic. The binder may be applied to the bands or their individual elements in any one of several ways which will be apparent to those familiar with the industry.

Figure 5:
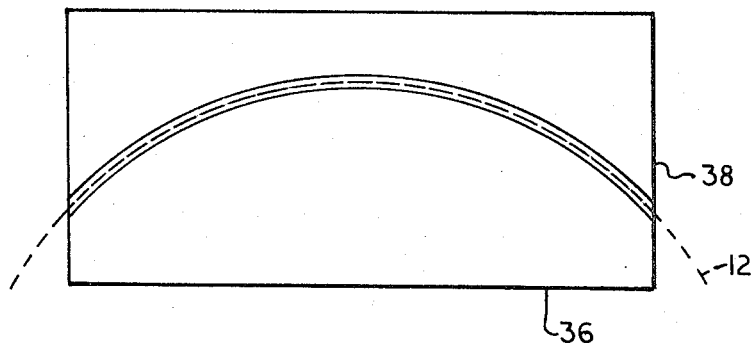
FIG. 5 is an end elevational view of a set of forming dies with a facing sheet laminate being formed therebetween.

The laminate can be shaped in any of a number of conventional ways, for example, by means of usual forming blocks or dies 36 and 38, see FIG. 5.

The invention provides a bonded, unitary, lightweight, apertured laminate, the apertures of which may be of selected size and shape, and distributed as required throughout the area of the laminate.

Having fully disclosed by invention, what I claim and desire to protect by letters patent. I claim:

1. The method of making an apertured laminate for use as the facing sheet for a sound absorptive panel having a backing sheet, a resonant chamber, and a facing sheet, said facing sheet having apertures therein of selected size, shape and distribution, which method comprises: arranging a first plurality of bands of selected material and of selected widths in parallel, side-by-side relation, thereby comprising a first layer of said bands, superimposing upon the bands of said first layer a second plurality of bands of selected material and of selected widths, also in parallel, side-by-side relation, thereby comprising a second layer of such bands, superimposing upon the bands of said second layer a third plurality of bands of selected material and of selected widths, also in parallel, side-by-side relation, thereby comprising a third layer of such bands, laterally adjacent bands of each of said layers spaced apart by selected widths to form gaps therebetween, the bands of each of said layers being disposed at a selected angle to the bands of each of the other layers, and so arranged that selected gaps in all of the layers intersect at common, selected points in the resulting laminate formed by the superpositioning of such layers of bands, thereby to form at each such selected point, an opening of selected size, shape and distribution in the laminate, and impregnating the laminate with a binder to band all of said bands together into an integral, apertured laminate.

2. The method defined in claim 1 wherein the widths of the bands, and the spacing between laterally adjacent bands in the same layer are varied to thereby predeterminedly vary the size and shape of the apertures and their location in the laminate.

3. The method defined in claim 1 wherein selected ones of the bands are of varied strength, thereby varying the strength of the completed laminate in the direction of such varied bands.

4. The method defined in claim 1 wherein edges of bands defining the sides of all of the gaps, intersecting at a common point to provide an aperture in the laminate, define the sides of such aperture.

* * * * *